(12) United States Patent
Du et al.

(10) Patent No.: US 11,121,367 B2
(45) Date of Patent: Sep. 14, 2021

(54) MODIFIED POSITIVE ELECTRODE ACTIVE MATERIAL, METHOD FOR PREPARING THE SAME AND ELECTROCHEMICAL ENERGY STORAGE DEVICE

(71) Applicant: Contemporary Amperex Technology Co., Limited, Ningde (CN)

(72) Inventors: Rui Du, Ningde (CN); Na Liu, Ningde (CN); Yongchao Liu, Ningde (CN); Sihui Wang, Ningde (CN); Zhongling Xu, Ningde (CN); Chao Yang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 15/577,290

(22) PCT Filed: Aug. 24, 2017

(86) PCT No.: PCT/CN2017/098785
§ 371 (c)(1),
(2) Date: Nov. 27, 2017

(87) PCT Pub. No.: WO2018/209837
PCT Pub. Date: Nov. 22, 2018

(65) Prior Publication Data
US 2019/0044135 A1 Feb. 7, 2019

(30) Foreign Application Priority Data
May 15, 2017 (CN) .......................... 201710338992.2

(51) Int. Cl.
*H01M 4/505* (2010.01)
*H01M 4/525* (2010.01)
(Continued)

(52) U.S. Cl.
CPC ......... *H01M 4/505* (2013.01); *H01M 4/0471* (2013.01); *H01M 4/139* (2013.01);
(Continued)

(58) Field of Classification Search
None
See application file for complete search history.

(56) References Cited

U.S. PATENT DOCUMENTS

| 2002/0071991 A1* | 6/2002 | Kweon | ................ | H01M 4/131 |
| | | | | 429/231.1 |
| 2014/0087259 A1 | 3/2014 | Li et al. | | |

(Continued)

FOREIGN PATENT DOCUMENTS

| CN | 1366363 A | 8/2002 |
| CN | 1731605 A | 2/2006 |

(Continued)

OTHER PUBLICATIONS

"island" defined by Your Dictionary, accessed at https://www.yourdictionary.com/island; Merriam-Webster Online Dict., accessed at https://www.merriam-webster.com/dictionary/island; and Webster's 1913 Dictionary and Wordnet Dictionary, accessed at http://www.webster-dictionary.org/definition/island (Year: 2020).*

(Continued)

*Primary Examiner* — Amanda J Barrow
(74) *Attorney, Agent, or Firm* — Law Offices of Liaoteng Wang (57) ABSTRACT

The disclosure provides a modified positive electrode active material, a preparation method thereof, and an electrochemical energy storage device. The modified positive electrode active material comprises positive electrode active material substrate; first oxide layer, coated on the surface of the positive electrode active material substrate and selected from one or more of oxides of element M being selected (Continued)

from the group of one or more of Li, Al, Zr, Mg, Ti, Y, Si, Ca, Cr, Fe, Zn, Nb, Sn, Ba, and Cd; and second oxide layer having a continuous layered structure, coated on the surface of the first oxide layer and selected from one or more of oxides of element M' being selected from one or more of Li, B, P, As, Pb, V, Mo, and Sn. High temperature storage performance and cycling performance of electrochemical energy storage device are improved by the modified positive electrode active material.

9 Claims, 5 Drawing Sheets

(51) Int. Cl.

| | | |
|---|---|---|
| *H01M 4/04* | (2006.01) | |
| *H01M 4/58* | (2010.01) | |
| *H01M 4/485* | (2010.01) | |
| *H01M 4/36* | (2006.01) | |
| *H01M 4/139* | (2010.01) | |
| *H01M 10/052* | (2010.01) | |
| *H01M 10/0525* | (2010.01) | |
| *H01M 4/50* | (2010.01) | |
| *H01M 4/62* | (2006.01) | |
| *H01M 4/02* | (2006.01) | |

(52) U.S. Cl.
CPC ........... *H01M 4/366* (2013.01); *H01M 4/485* (2013.01); *H01M 4/502* (2013.01); *H01M 4/525* (2013.01); *H01M 4/5825* (2013.01); *H01M 4/621* (2013.01); *H01M 10/052* (2013.01); *H01M 10/0525* (2013.01); *H01M 2004/028* (2013.01)

(56) References Cited

U.S. PATENT DOCUMENTS

| | | | | |
|---|---|---|---|---|
| 2014/0234704 A1* | 8/2014 | Kamizori | ............... | H01M 4/525 |
| | | | | 429/200 |
| 2016/0190559 A1* | 6/2016 | Hou | .................... | H01M 4/0421 |
| | | | | 429/223 |
| 2016/0268634 A1* | 9/2016 | Woo | .................. | H01M 10/0567 |
| 2016/0336595 A1 | 11/2016 | Choi et al. | | |
| 2016/0380271 A1* | 12/2016 | Ochiai | .................. | H01M 4/663 |
| | | | | 429/245 |
| 2017/0012284 A1* | 1/2017 | Bugga | .................... | H01M 4/505 |
| 2017/0069907 A1* | 3/2017 | Zhu | ........................ | H01M 4/131 |
| 2017/0133676 A1* | 5/2017 | Kodato | ................. | H01M 4/505 |

FOREIGN PATENT DOCUMENTS

| | | | | |
|---|---|---|---|---|
| CN | 1278438 C | | 10/2006 | |
| CN | 102569775 A | | 7/2012 | |
| CN | 102931384 A | | 2/2013 | |
| CN | 102931384 A | | 2/2013 | |
| CN | 103441255 A | | 12/2013 | |
| CN | 104600282 A | | 5/2015 | |
| CN | 106328925 A | | 1/2017 | |
| CN | 106450270 A | | 2/2017 | |
| EP | 3336939 | * | 6/2018 | ............ H01M 4/505 |
| EP | 3336939 A1 | | 6/2018 | |
| JP | 2002-175801 | * | 6/2002 | .............. H01M 4/02 |
| JP | 2014127235 A | | 7/2014 | |
| WO | WO 2017/025007 | * | 2/2017 | ............ H01M 4/505 |
| WO | WO2017025007 A1 | | 2/2017 | |

OTHER PUBLICATIONS

Cho et al., Novel LiCoO2 Cathode Material with Al2O3 Coating fora Li Ion Cell, Chem. Mater., 2000, 12, 3788-3791, Published on Web Nov. 28, 2000 (Year: 2000).*
Zheng et al., "Role of Mn content on the electrochemical properties of nickel-rich layered LiNi0.8-xCo0.1Mn0.1+xO2 (0.01 <x < 0.08 cathodes for lithium-ion batteries," Applied Mater. & Interfac. Published Mar. 10, 2015, pp. 6926-6934 (Year: 2015).*
Tae Eun Hong et al, "Nano SIMS characterization of boron- and aiuminum-coated LiNiCoMnO cathode materials for lithium secondary ion batteries", Journal of Applied Electrochemistry, dated Dec. 7, 2011, pp. 41-46.
The Extended European Search Report for European Application No. 17800353.9, dated Oct. 31, 2018, 10 pages.
Fu et al., "Nickel-Rich Layered Microspheres Cathodes: Lithium/Nickel Disordering and Electrochemical Performance", ACS Applied Materials & Interfaces 2014, 6, pp. 15822-15831.

* cited by examiner

MODIFIED POSITIVE ELECTRODE ACTIVE MATERIAL, METHOD FOR PREPARING THE SAME AND ELECTROCHEMICAL ENERGY STORAGE DEVICE

CROSS-REFERENCE TO RELATED APPLICATION

This application is based on and claims priority to Chinese Patent Application No. 201710338992.2 filed on May 15, 2017, which is incorporated herein by reference in its entirety.

TECHNICAL FIELD

The disclosure relates to the field of energy storage devices, and more particularly, to a modified positive electrode active material and a method for preparing the same as well as an electrochemical energy storage device.

BACKGROUND

In recent years, with the rapid growth of intelligent electronic products, the development of lithium-ion batteries having high energy density and high safety performance has become a focus of research and development (R & D) personnel. Among others, lithium-nickel-manganese-cobalt-based oxide ternary materials (nickel-rich $LiNi_xCo_yMn_zO_2$ cathode materials, also referred to as "Ni-rich NCM ternary materials") have been widely concerned due to high capacity and low cost. However, in practical applications, Ni-rich NCM ternary materials have unstable surface structure, and side reactions are accelerated on the Ni-rich cathode/electrolyte interface due to the high oxidative activity of $Ni^{4+}$ ions, leading to gas generation especially at high temperatures and impacting the safety performance of lithium-ion battery.

Currently, the main solution to solve these problems is to cover the surface of Ni-rich NCM ternary material with a coating layer and form a coating on its surface. The coating layer can effectively reduce the direct contact of Ni-rich NCM ternary materials with electrolyte, and inhibit the side reactions. However, it is difficult to uniformly cover the surface of Ni-rich NCM ternary materials by conventional coating methods. As a result, the coating has very limited inhibition effects on the side reaction between Ni-rich NCM ternary materials and electrolyte, and thus cannot fundamentally solve the problem.

SUMMARY

In view of the problems in the background art, it is an object of the present disclosure to provide a modified positive electrode active material and a method for preparing the same as well as an electrochemical energy storage device, wherein the modified positive electrode active material has good structural stability and after application in an electrochemical energy storage device, the modified positive electrode active material can reduce the side reaction between the positive electrode active material substrate and the electrolyte, reduce the gas production capacity of the electrochemical energy storage device, improve the high temperature storage performance of the electrochemical energy storage device, and thus improve the safety performance of the electrochemical energy storage device, meanwhile improving cycling performance of the electrochemical energy storage device and extending the service life of the electrochemical energy storage device.

In order to achieve the above object, in an aspect of the present disclosure, the present disclosure provides a modified positive electrode active material comprising a positive electrode active material substrate, a first oxide layer, and a second oxide layer. The first oxide layer is coated on the surface of the positive electrode active material substrate. The first oxide layer is selected from one or more of the oxides of element M, wherein the element M is selected from the group consisting of one or more of Li, Al, Zr, Mg, Ti, Y, Si, Ca, Cr, Fe, Zn, Nb, Sn, Ba, and Cd. The second oxide layer is coated on the surface of the first oxide layer and has a continuous layered structure. The second oxide layer is selected from one or more of the oxides of element M', wherein the element M' is selected from one or more of Li, B, P, As, Pb, V, Mo, and Sn. The first oxide layer is different from the second oxide layer in terms of composition.

In another aspect of the present disclosure, the disclosure provides a process for preparing a modified positive electrode active material for use in the preparation of a modified positive electrode active material according to one aspect of the present disclosure, the process comprising the steps of: (i) mixing homogeneously a positive electrode active material substrate with first oxide layer itself or the precursor thereof followed by sintering, to coat the surface of the positive electrode active material substrate with the first oxide layer selected from one or more of the oxides of element M, wherein the element M is selected from the group consisting of one or more of Li, Al, Zr, Mg, Ti, Y, Si, Ca, Cr, Fe, Zn, Nb, Sn, Ba, and Cd; (ii) mixing homogeneously the substance obtained in step (i) with second oxide layer itself or the precursor thereof followed by sintering, so that the formed second oxide layer is coated on the surface of the first oxide layer, and has a continuous layered structure, wherein the second oxide layer is selected from one or more of the oxides of element M', wherein the element M' is selected from one or more of Li, B, P, As, Pb, V, Mo, and Sn, and wherein the first oxide layer is different from the second oxide layer in terms of composition.

In another aspect of the present disclosure, the disclosure provides an electrochemical energy storage device comprising the modified positive electrode active material according to one aspect of the present disclosure.

As compared with the prior art, the present disclosure has the following advantages:

The modified positive electrode active material according to the disclosure has good structural stability and after application in an electrochemical energy storage device, the modified positive electrode active material can reduce the side reaction between the positive electrode active material substrate and electrolyte, reduce the gas production capacity of the electrochemical energy storage device, improve the high temperature storage performance of the electrochemical energy storage device, and thus improve the safety performance of the electrochemical energy storage device, meanwhile improving cycling performance of the electrochemical energy storage device and extending the service life of the electrochemical energy storage device.

In the drawing, the reference signs are described as follows:

1 first oxide layer
2 second oxide layer
3 positive electrode active material substrate.

DETAILED DESCRIPTION

The modified positive electrode active material according to the present disclosure, the preparation method thereof, and the electrochemical energy storage device will be described in details below.

First, the modified positive electrode active material according to the first aspect of the present disclosure will be described.

Figure 1:
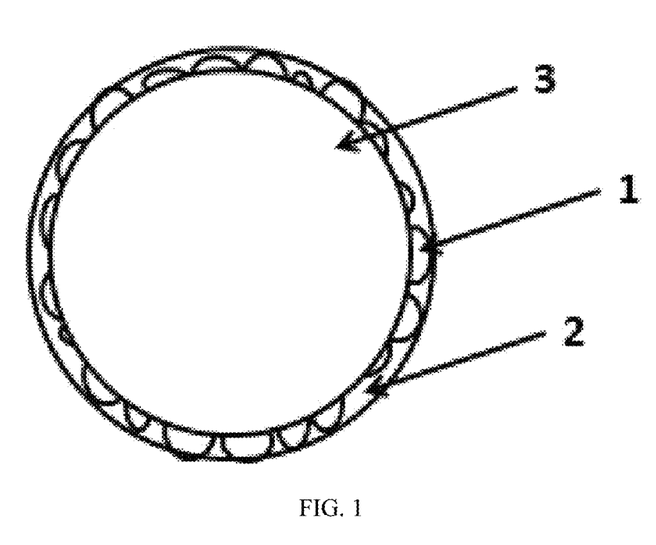
FIG. 1 is a schematic structural view of a modified positive electrode active material according to the present disclosure.

The modified positive electrode active material comprises a positive electrode active material substrate, a first oxide layer, and a second oxide layer. The first oxide layer is coated on the surface of the positive electrode active material substrate. The first oxide layer is selected from one or more of the oxides of element M, wherein the element M is selected from the group consisting of one or more of Li, Al, Zr, Mg, Ti, Y, Si, Ca, Cr, Fe, Zn, Nb, Sn, Ba, and Cd. In other words, the oxide of element M is an oxide comprising one or more elements of Li, Al, Zr, Mg, Ti, Y, Si, Ca, Cr, Fe, Zn, Nb, Sn, Ba, and Cd. The second oxide layer is coated on the surface of the first oxide layer and has a continuous layered structure. The second oxide layer is selected from one or more of the oxides of element M', wherein the element M' is selected from one or more of Li, B, P, As, Pb, V, Mo, and Sn. In other words, the oxide of element M' is an oxide comprising one or more elements of Li, B, P, As, Pb, V, Mo, and Sn. FIG. 1 is a schematic structural view of a modified positive electrode active material according to the present disclosure, wherein "1" represents first oxide layer, "2" represents second oxide layer, and "3" represents positive electrode active material substrate.

In the modified positive electrode active material according to the first aspect of the present disclosure, the first oxide layer is different from the second oxide layer in terms of composition.

In the modified positive electrode active material according to the first aspect of the present disclosure, the first oxide layer formed from first oxide layer substance itself or from the precursor of the first oxide layer substance after the high-temperature heat treatment is firmly bonded to the positive electrode active material substrate and is stably coated on the surface of the positive electrode active material substrate, functioning as a first protection to the positive electrode active material substrate. The second oxide layer is softened, after heat treatment at high temperature during the preparation process due to the low melting point of the second oxide layer substance itself or its precursor, thereby forming a continuous and compact coating. The coating covers the surface of the first oxide layer and functions as an overall second protection to the positive electrode active material substrate. Especially when the first oxide layer is distributed on the surface of the positive electrode active material substrate in an island-like or continuous island shape, the second oxide layer can comprehensively and effectively cover the positive electrode active material substrate, thereby preventing the positive electrode active material substrate from being exposed to electrolyte. As a result, the modified positive electrode active material according to the disclosure has good interfacial stability. The double protections of the first oxide layer and the second oxide layer can greatly avoid the contact of the positive electrode active material substrate with electrolyte and avoid undergoing side reactions, thereby reducing the gas production capacity of the electrochemical energy storage device at a high temperature, improving the high temperature storage performance of the electrochemical energy storage device, and thus improving the safety performance of the electrochemical energy storage device. Meanwhile, under the double protections of the first oxide layer and the second oxide layer, the electrochemical energy storage device has an improved cycling performance and an extended service life.

In the modified positive electrode active material according to the first aspect of the present disclosure, the element M is present in an amount of 0.01% to 2% in the first oxide layer and the element M' is present in an amount of 0.01% to 1% in the second oxide layer, based on the mass of the positive electrode active material substrate. Excessively high amounts of element M and/or element M' will lead to the formation of excessively thick coating, thereby resulting in the increased polarization of electrochemical energy storage device and affecting the electrochemical performance of electrochemical energy storage device.

In the modified positive electrode active material according to the first aspect of the present disclosure, the first oxide layer coated on the surface of the positive electrode active material substrate has an island-like or continuous island shape.

In the modified positive electrode active material according to the first aspect of the present disclosure, the positive electrode active material substrate is selected from the group consisting of one or more of lithium cobalt oxide, lithium iron phosphate, lithium manganese oxide, lithium-nickel-manganese-cobalt-based oxide ternary material, lithium-nickel-cobalt-aluminum-based oxide ternary material.

Figure 2:
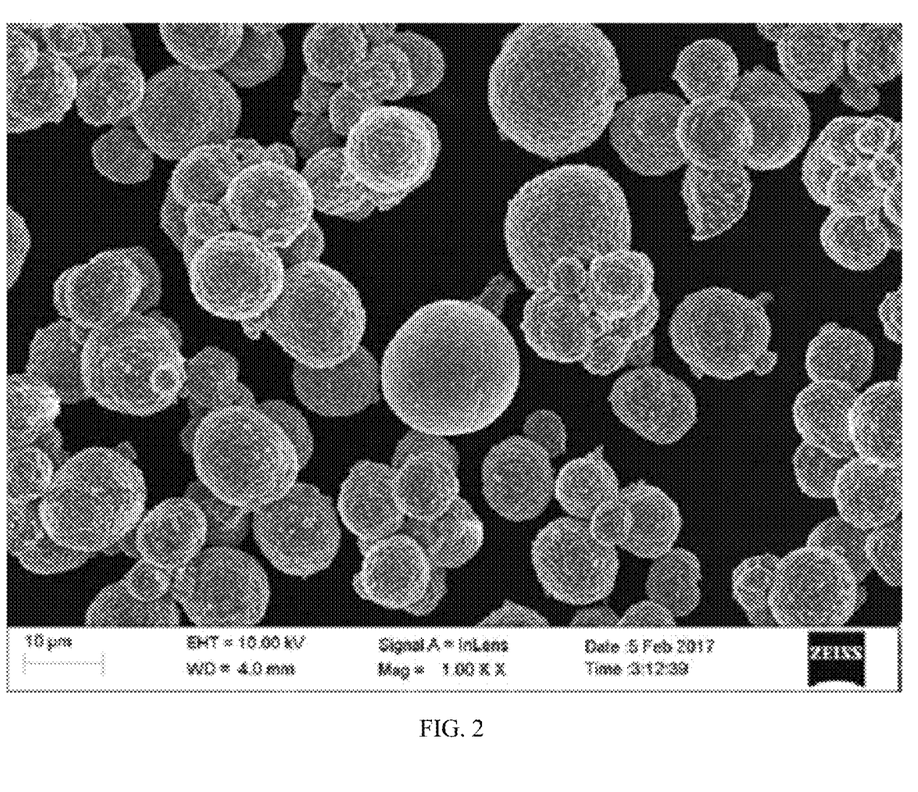
FIG. 2 is a SEM image (1000 times) of the positive electrode active material substrate of Example 1.
Figure 3:
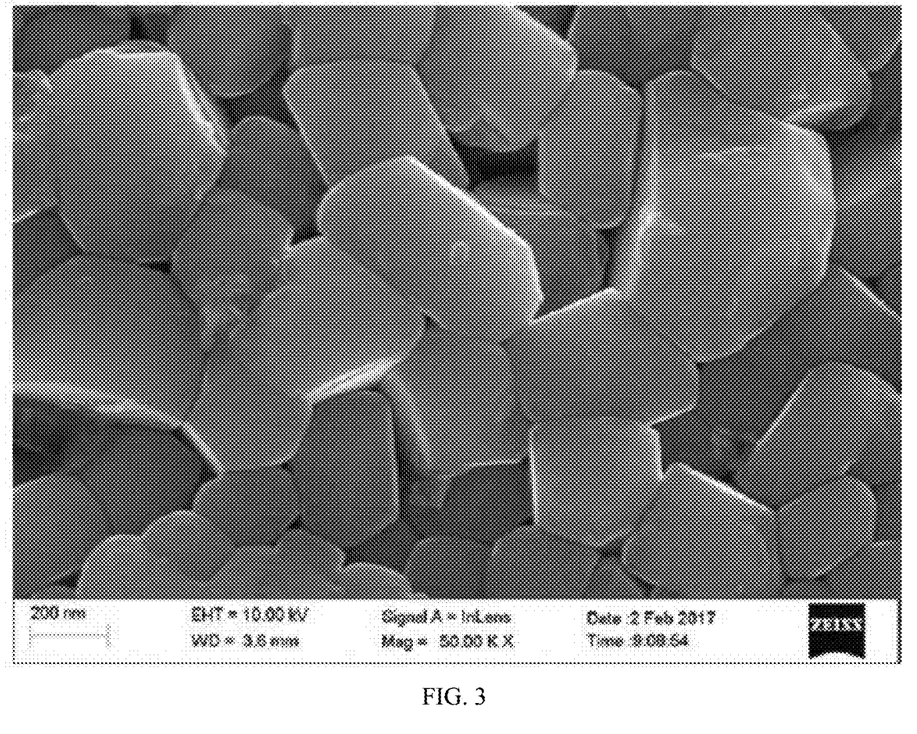
FIG. 3 is a SEM image (50000 times) of the positive electrode active material substrate of Example 1.

In the modified positive electrode active material according to the first aspect of the present disclosure, the positive electrode active material substrate comprises primary particles as well as secondary particles formed by agglomeration of the primary particles as shown in FIGS. 2 and 3; and wherein the primary particles of the positive electrode active material substrate have a particle diameter of 0.2 μM to 1 μm and the secondary particles have a particle diameter of 5 μm to 18 μm.

Second, a method for preparing a modified positive electrode active material according to the second aspect of the present disclosure will be described.

The method for preparing a modified positive electrode active material according to the second aspect of the present disclosure is used for preparing the modified positive electrode active material according to the first aspect of the present disclosure. The method comprises the steps of: (i) mixing homogeneously a positive electrode active material substrate with first oxide layer substance itself or the precursor thereof, followed by sintering, to coat the surface of the positive electrode active material substrate with the first oxide layer, wherein the first oxide layer is selected from one or more of the oxides of element M, and the element M is selected from the group consisting of one or more of Li, Al, Zr, Mg, Ti, Y, Si, Ca, Cr, Fe, Zn, Nb, Sn, Ba, and Cd; (ii) mixing homogeneously the substance obtained in step (i)

with second oxide layer substance itself or the precursor thereof, followed by sintering, so that the formed second oxide layer is coated on the surface of the first oxide layer and has a continuous layered structure, wherein the second oxide layer is selected from one or more of the oxides of element M' and the element M' is selected from one or more of Li, B, P, As, Pb, V, Mo, and Sn, thus yielding the modified positive electrode active material; wherein the first oxide layer is different from the second oxide layer in terms of composition.

In an embodiment, in the method for preparing the modified positive electrode active material according to the second aspect of the present disclosure, the temperature of sintering in step (ii) is equal to or greater than the melting point of the precursor of the second oxide layer substance.

In an embodiment, in the method for preparing the modified positive electrode active material according to the second aspect of the present disclosure, the melting point of the first oxide layer substance itself is higher than that of the precursor of the second oxide layer substance, so that when the temperature of sintering in step (ii) is equal to or greater than the melting point of the precursor of the second oxide layer substance, the first oxide layer is still stably coated on the surface of the positive electrode active material substrate, and meanwhile the precursor of the second oxide layer substance after being softened is uniformly coated on the surface of the first oxide layer, thereby forming a compact and continuous second oxide layer. In this case, as long as the melting point of the first oxide layer substance itself is higher than the melting point of the precursor of the second oxide layer substance, the temperature of sintering in step (ii) is higher than or equal to the melting point of the precursor of the second oxide layer substance, regardless of the melting point of the second oxide layer substance formed after sintering.

In another embodiment, in the method for preparing the modified positive electrode active material according to the second aspect of the present disclosure, the temperature of sintering in step (ii) is equal to or greater than the melting point of the second oxide layer substance itself.

In another embodiment, in the method for preparing the modified positive electrode active material according to the second aspect of the present disclosure, the melting point of the first oxide layer substance itself is higher than that of the second oxide layer substance itself, so that when the temperature of sintering in step (ii) is equal to or greater than the melting point of the second oxide layer substance itself, the first oxide layer is still stably coated on the surface of the positive electrode active material substrate, and meanwhile the second oxide layer substance after being softened is uniformly coated on the surface of the first oxide layer, thereby forming a compact and continuous second oxide layer.

In another embodiment, in the method for preparing the modified positive electrode active material according to the second aspect of the present disclosure, the temperature of sintering in step (ii) is lower than that in step (i).

In another embodiment, in the method for preparing the modified positive electrode active material according to the second aspect of the present disclosure, the temperature of sintering in step (i) is 600° C. to 700° C., with the heating rate of 5° C./min to 15° C./min and the sintering time of 0.5 h to 8 h.

In another embodiment, in the method for preparing the modified positive electrode active material according to the second aspect of the present disclosure, the temperature of sintering in step (i) is 400° C. to 600° C., with the heating rate of 5° C./min to 15° C./min and the sintering time of 0.5 h to 8 h.

Third, an electrochemical energy storage device according to the third aspect of the present disclosure will be described.

The electrochemical energy storage device according to the third aspect of the present disclosure comprises the modified positive electrode active material according to the first aspect of the present disclosure.

In the electrochemical energy storage device according to the third aspect of the present disclosure, it is to be noted that the electrochemical energy storage device may be a supercapacitor, a lithium ion battery or a sodium ion battery. In Examples of the present disclosure, examples of the electrochemical energy storage device are just shown as examples of a lithium ion battery, but the present disclosure is not limited thereto.

In a lithium ion battery, the positive electrode plate includes a positive electrode current collector and a positive electrode film on the positive electrode current collector. The positive electrode film comprises a modified positive electrode active material according to the first aspect of the present disclosure. The positive electrode current collector is an aluminum foil.

In a lithium ion battery, the negative electrode sheet includes a negative electrode current collector and a negative electrode film on the negative electrode current collector. The negative electrode current collector is a copper foil.

In a lithium ion battery, the negative electrode active material is selected from the group consisting of artificial graphite and natural graphite. The conductive agent for negative electrode is selected from one or more of acetylene black, conductive carbon black (Super P, Super S, 350G), carbon fiber (VGCF), carbon nanotube (CNT), Ketjen black.

In a lithium ion battery, the electrolyte may be a liquid electrolyte, and the electrolyte may include a lithium salt and an organic solvent.

In a lithium ion battery, the specific type of the lithium salt is not limited. In particular, the lithium salt may be selected from the group consisting of $LiPF_6$, $LiBF_4$, $LiN(SO_2F)_2$ (abbreviated as LiFSI), $LiN(CF_3SO_2)_2$ (abbreviated as LiTFSI), $LiClO_4$, $LiAsF_6$, $LiB(C_2O_4)_2$ (abbreviated as LiBOB), $LiBF_2C_2O_4$ (abbreviated as LiDFOB).

In a lithium ion battery, the specific type of the organic solvent is not particularly limited and can be selected depending on the actual requirements. Preferably, a nonaqueous organic solvent is used. The nonaqueous organic solvent may comprise any kinds of carbonates and/or carboxylates. The carbonates may comprise cyclic carbonates or chain carbonates. The nonaqueous organic solvent may further comprise a halogenated compound of a carbonate. In particular, the organic solvent is selected from the group consisting of one or more of ethylene carbonate (EC), propylene carbonate (PC), butylene carbonate, pentylene carbonate, fluoroethylene carbonate, dimethyl carbonate, diethyl carbonate (DEC), dipropyl carbonate, methyl ethyl carbonate, γ-butyrolactone, methyl formate, ethyl formate, ethyl propionate, propyl propionate, and tetrahydrofuran.

In a lithium ion battery, the type of the separator is not specifically limited and can be selected according to actual requirements.

The invention will be further described with reference to the following examples. It is to be understood that these examples are merely illustrative of the invention and are not intended to limit the scope of the invention. In Examples, the electrochemical energy storage device is just shown as a lithium ion battery, but the present invention is not limited there to.

In the following examples, the reagents, materials and apparatus used, if not specifically described, are commercially available.

Example 1

(1) Preparation of the Modified Positive Electrode Active Material

First, 100 g of a positive electrode active material substrate of lithium-nickel-manganese-cobalt-based oxide ternary material $LiNi_{0.8}Co_{0.1}Mn_{0.1}O_2$ (containing primary particles having a particle diameter D50 of 0.4 μm and secondary particles having a particle diameter D50 of 12 μm) and 0.57 g of aluminum oxide were mixed homogeneously through high-speed mixer, wherein the amount of elemental aluminum is 0.3% of the mass of the positive electrode active material substrate. After dry mixing for 4 h, the mixture was subjected to heat-treatment by sintering at 600° C., to coat the first oxide layer on the surface of the lithium-nickel-manganese-cobalt-based oxide ternary material. In other words, a layer of aluminum oxide was coated on the surface of the lithium-nickel-manganese-cobalt-based oxide ternary material.

The sample of the above lithium-nickel-manganese-cobalt-based oxide ternary material coated with the aluminum oxide-containing layer was then mixed homogeneously with 0.65 g of boron oxide, wherein the amount of elemental boron was 0.2% of the mass of the positive electrode active material substrate. After heat-treatment by sintering at 450° C., a modified positive electrode active material was obtained, i.e. a modified lithium-nickel-manganese-cobalt-based oxide ternary material coated with the aluminum oxide-containing layer and the boron oxide-containing layer.

(2) Preparation of the Positive Electrode Plate

The above-mentioned modified positive electrode active material, the positive electrode conductive agent Super P and the binder polyvinylidene fluoride (PVDF) at a mass ratio of 97:2:1 were mixed homogeneously with the solvent N-methylpyrrolidone (NMP) to prepare a positive electrode paste. Then the positive electrode paste was uniformly coated on a positive current collector aluminum foil having a thickness of 12 μm and oven dried at 85° C., followed by cold pressing, edge cutting, cutting, and slitting. Then the resulting samples were oven dried for 4 h under vacuum at 85° C. again. After tab welding, the preparation of the positive electrode plate was completed.

(3) Preparation of the Negative Electrode Plate

The negative electrode active material, the negative electrode conductive agent Super P, the thickening agent CMC and the binder SBR at a mass ratio of 97:1:1:1 were mixed homogeneously with the solvent deionized water to prepare a negative electrode paste. Then the negative electrode paste was uniformly coated on a current collector copper foil and oven dried at 85° C., followed by cold pressing, edge cutting, cutting, and slitting. Then the resulting samples were oven dried for 4 h under vacuum at 110° C. After tab welding, the preparation of the negative electrode plate was completed.

(4) Preparation of Electrolyte

In an argon atmosphere glove box having a water content of <10 ppm, ethylene carbonate (EC), propylene carbonate (PC) and dimethyl carbonate (DEC) were mixed in a volume ratio of EC:PC:DEC=1:1:1. Then, the fully dried lithium salt $LiPF_6$ was dissolved in a mixed organic solvent. The mixture was homogeneously mixed to obtain an electrolyte in which the concentration of $LiPF_6$ was 1 mol/L.

(5) Preparation of Separator

A polypropylene film was used as the separator.

(6) Preparation of Lithium Ion Battery

The obtained positive electrode plate, the separator and the negative electrode plate were stacked in order, so that the separator was set between the positive electrode plate and the negative electrode plate. After winding, a bare battery core was obtained. The bare battery core was placed in the outer packaging for the battery core. The electrolyte was then injected. After the steps of sealing, standing, forming, and shaping, the preparation of lithium ion battery was completed. The capacity of the lithium ion battery was also tested.

Example 2

The lithium ion battery was prepared in the same manner as in Example 1 except that, (1) Preparation of the Modified Positive Electrode Active Material The amount of $Al_2O_3$ was 0.02 g, wherein the amount of the elemental aluminum is 0.01% of the mass of the positive electrode active material substrate.

The amount of $B_2O_3$ was 0.03 g, wherein the amount of the elemental boron is 0.01% of the mass of the positive electrode active material substrate.

Example 3

The lithium ion battery was prepared in the same manner as in Example 1 except that, (1) Preparation of the Modified Positive Electrode Active Material The amount of $Al_2O_3$ was 0.02 g, wherein the amount of the elemental aluminum is 0.01% of the mass of the positive electrode active material substrate.

The amount of $B_2O_3$ was 3.23 g, wherein the amount of the elemental boron is 1% of the mass of the positive electrode active material substrate.

Example 4

The lithium ion battery was prepared in the same manner as in Example 1 except that, (1) Preparation of the Modified Positive Electrode Active Material The amount of $Al_2O_3$ was 3.77 g, wherein the amount of the elemental aluminum is 2% of the mass of the positive electrode active material substrate.

The amount of $B_2O_3$ was 0.03 g, wherein the amount of the elemental boron is 0.01% of the mass of the positive electrode active material substrate.

Example 5

The lithium ion battery was prepared in the same manner as in Example 1 except that, (1) Preparation of the Modified Positive Electrode Active Material The amount of $Al_2O_3$ was 3.77 g, wherein the amount of the elemental aluminum is 3% of the mass of the positive electrode active material substrate.

The amount of $B_2O_3$ was 3.22 g, wherein the amount of the elemental boron is 1% of the mass of the positive electrode active material substrate.

Example 6

The lithium ion battery was prepared in the same manner as in Example 1 except that, (1) Preparation of the Modified Positive Electrode Active Material First, 100 g of a positive electrode active material substrate of lithium-nickel-manganese-cobalt-based oxide ternary material $LiNi_{0.8}Co_{0.1}Mn_{0.1}O_2$ (containing primary particles having a particle diameter D50 of 0.4 μm and secondary particles having a particle diameter D50 of 12 μm) and 0.50 g of $TiO_2$ were mixed homogeneously through high-speed mixer, wherein the amount of elemental titanium is 0.3% of the mass of the positive electrode active material substrate. After dry mixing for 4 h, the mixture was subjected to heat-treatment by sintering at 600° C., to coat the first oxide layer on the surface of the lithium-nickel-manganese-cobalt-based oxide ternary material. In other words, a layer of titanium oxide was coated on the surface of the lithium-nickel-manganese-cobalt-based oxide ternary material.

The sample of the above lithium-nickel-manganese-cobalt-based oxide ternary material coated with the titanium oxide-containing layer was then mixed homogeneously with 0.46 g of $P_2O_5$, wherein the amount of elemental phosphorus was 0.2% of the mass of the positive electrode active material substrate. After heat-treatment by sintering at 450° C., a modified positive electrode active material was obtained, i.e. a modified lithium-nickel-manganese-cobalt-based oxide ternary material coated with the titanium oxide-containing layer and the phosphorous oxide-containing layer.

Example 7

The lithium ion battery was prepared in the same manner as in Example 1 except that, (1) Preparation of the Modified Positive Electrode Active Material First, 100 g of a positive electrode active material substrate of lithium-nickel-manganese-cobalt-based oxide ternary material $LiNi_{0.8}Co_{0.1}Mn_{0.1}O_2$ (containing primary particles having a particle diameter D50 of 0.4 μm and secondary particles having a particle diameter D50 of 12 μm) and 0.57 g of aluminum oxide were mixed homogeneously through high-speed mixer, wherein the amount of elemental aluminum is 0.3% of the mass of the positive electrode active material substrate. After dry mixing for 4 h, the mixture was subjected to heat-treatment by sintering at 600° C., to coat the first oxide layer on the surface of the lithium-nickel-manganese-cobalt-based oxide ternary material. In other words, a layer of aluminum oxide was coated on the surface of the lithium-nickel-manganese-cobalt-based oxide ternary material.

The sample of the above lithium-nickel-manganese-cobalt-based oxide ternary material coated with the aluminum oxide-containing layer was then mixed homogeneously with 1.11 g of $H_3BO_3$, wherein the amount of elemental boron was 0.2% of the mass of the positive electrode active material substrate. After heat-treatment by sintering at 450° C., a modified positive electrode active material was obtained, i.e. a modified lithium-nickel-manganese-cobalt-based oxide ternary material coated with the aluminum oxide-containing layer and the boron oxide-containing layer.

Comparative Example 1

The lithium ion battery was prepared in the same manner as in Example 1 except that, (1) Preparation of the Modified Positive Electrode Active Material Powders of lithium-nickel-manganese-cobalt-based oxide ternary material $LiNi_{0.8}Co_{0.1}Mn_{0.1}O_2$ were directly used as a positive electrode active material, without coating modification treatment.

Comparative Example 2

The lithium ion battery was prepared in the same manner as in Example 1 except that, (1) Preparation of the Modified Positive Electrode Active Material 100 g of a positive electrode active material substrate of lithium-nickel-manganese-cobalt-based oxide ternary material $LiNi_{0.8}Co_{0.1}Mn_{0.1}O_2$ and 0.57 g of aluminum oxide were mixed homogeneously through high-speed mixer. After dry mixing for 4 h, the mixture was subjected to heat-treatment by sintering at 600° C., to obtain the modified positive electrode active material, i.e. the lithium-nickel-manganese-cobalt-based oxide ternary material coated with the aluminum oxide-containing layer.

Comparative Example 3

The lithium ion battery was prepared in the same manner as in Example 1 except that, (1) Preparation of the Modified Positive Electrode Active Material 100 g of a positive electrode active material substrate of lithium-nickel-manganese-cobalt-based oxide ternary material $LiNi_{0.8}Co_{0.0}Mn_{0.1}O_2$ and 0.65 g of boron oxide were mixed homogeneously through high-speed mixer. After dry mixing for 4 h, the mixture was subjected to heat-treatment by sintering at 450° C., to obtain the modified positive electrode active material, i.e. the lithium-nickel-manganese-cobalt-based oxide ternary material coated with the boron oxide-containing layer.

Comparative Example 4

The lithium ion battery was prepared in the same manner as in Example 1 except that, (1) Preparation of the Modified Positive Electrode Active Material 100 g of a positive electrode active material substrate of lithium-nickel-manganese-cobalt-based oxide ternary material $LiNi_{0.8}Co_{0.1}Mn_{0.1}O_2$ and 0.65 g of boron oxide were mixed homogeneously through high-speed mixer. After dry mixing for 4 h, the mixture was subjected to heat-treatment by sintering at 450° C., to obtain the modified positive electrode active material, i.e. the lithium-nickel-manganese-cobalt-based oxide ternary material coated with the boron oxide-containing layer.

The sample of the above lithium-nickel-manganese-cobalt-based oxide ternary material coated with the boron oxide-containing layer was then mixed homogeneously with 0.57 g of aluminum oxide. The mixture was subjected to heat-treatment by sintering at 600° C., to obtain the modified positive electrode active material, i.e. a modified lithium-nickel-manganese-cobalt-based oxide ternary material coated with the aluminum oxide-containing layer and the boron oxide-containing layer, wherein the amount of elemental aluminum was 0.3% of the mass of the positive electrode active material substrate and the amount of elemental boron was 0.2% of the mass of the positive electrode active material substrate.

Comparative Example 5

The lithium ion battery was prepared in the same manner as in Example 1 except that,
(1) Preparation of the Modified Positive Electrode Active Material 100 g of a positive electrode active material substrate of lithium-nickel-manganese-cobalt-based oxide ternary material $LiNi_{0.8}Co_{0.0}Mn_{0.1}O_2$, 0.65 g of boron oxide and 0.57 g of aluminum oxide were mixed homogeneously through high-speed mixer. After dry mixing for 4 h, the mixture was subjected to heat-treatment by sintering at 450° C., to obtain the modified positive electrode active material, i.e. the lithium-nickel-manganese-cobalt-based oxide ternary material coated with the aluminum oxide-containing layer and the boron oxide-containing layer, wherein the amount of elemental aluminum was 0.3% of the mass of the positive electrode active material substrate and the amount of elemental boron was 0.2% of the mass of the positive electrode active material substrate.

Comparative Example 6

The lithium ion battery was prepared in the same manner as in Example 1 except that,
(1) Preparation of the Modified Positive Electrode Active Material 100 g of a positive electrode active material substrate of lithium-nickel-manganese-cobalt-based oxide ternary material $LiNi_{0.8}Co_{0.0}Mn_{0.1}O_2$, 0.65 g of boron oxide and 0.57 g of aluminum oxide were mixed homogeneously through high-speed mixer. After dry mixing for 4 h, the mixture was subjected to heat-treatment sintering at 600° C., to obtain the modified positive electrode active material, i.e. the lithium-nickel-manganese-cobalt-based oxide ternary material coated with the aluminum oxide-containing layer and the boron oxide-containing layer, wherein the amount of elemental aluminum was 0.3% of the mass of the positive electrode active material substrate and the amount of elemental boron was 0.2% of the mass of the positive electrode active material substrate.

Next, the procedure for testing the lithium ion battery will be described.
(1) Cycling Performance Test of Lithium Ion Battery At 25° C., the lithium ion battery was charged to 4.3 V at a constant current of 1 C, and then charged to a current of 0.05 C at a constant voltage of 4.3 V, then discharged at a constant current of 1 C until the final voltage was 2.8 V. The discharge capacity of the first cycle was recorded, and then the charging and discharging cycles were performed to detect the discharge capacity at the 50th cycle.

Capacity retention rate (%) of lithium ion battery
after 50 cycles at 25° C.=[Discharge capacity at
the 50th cycle/Discharge capacity at the first
cycle]×100%.

(2) High Temperature Storage Performance Test of Lithium Ion Battery

At 25° C., the lithium ion battery was charged to 4.3 V at a constant current of 0.5 C, and then charged to a current of 0.025 C at a constant voltage of 4.3 V. The initial volume of the lithium ion battery was then measured by using the water displacement method in the deionized water. The lithium ion battery was placed and stored at 85° C. for 7 days. After storage, the volume variation of the lithium-ion battery after high temperature storage was measured.

Volume expansion ratio (%) of lithium ion battery
after storage at 85° C.=[volume of lithium ion
battery after high temperature storage/volume of
lithium ion battery before high temperature
storage−1]×100%.

TABLE 1

Parameters in Examples 1-7 and Comparative Examples 1-6

| | Coating | | Amount of element M (%) | Amount of element M' (%) | Volume expansion ratio after storage at 85° C. (%) | Capacity retention rate after 50 cycles at 25° C./% |
|---|---|---|---|---|---|---|
| | Element M | Element M' | | | | |
| Example 1 | Al | B | 0.3 | 0.2 | 62 | 96 |
| Example 2 | Al | B | 0.01 | 0.01 | 106 | 94 |
| Example 3 | Al | B | 0.01 | 1 | 75 | 97 |
| Example 4 | Al | B | 2 | 0.01 | 55 | 97 |
| Example 5 | Al | B | 2 | 1 | 35 | 97 |
| Example 6 | Ti | P | 0.3 | 0.2 | 80 | 95 |
| Example 7 | Al | B | 0.3 | 0.2 | 65 | 96 |
| Comparative Example 1 | \ | \ | \ | \ | 125 | 91 |
| Comparative Example 2 | Al | | 0.3 | | 88 | 93 |
| Comparative Example 3 | B | | 0.2 | | 97 | 93 |
| Comparative Example 4 | B | Al | 0.2 | 0.3 | 88 | 93 |
| Comparative Example 5 | Al, B (Low temperature) | | 0.3 | 0.2 | 102 | 93 |
| Comparative Example 6 | Al, B (high temperature) | | 0.3 | 0.2 | 89 | 93 |

Based on the analysis of the related data in Table 1, it was found in Examples 1-7 and Comparative Example 1 that the high temperature storage performance of the lithium ion battery using the modified positive electrode active material of the present disclosure was remarkably improved. In addition, after the surface of the positive electrode active material substrate is coated with the first oxide layer and the second oxide layer, the lithium ion battery has a remarkably improved cycling performance and a prolonged service life.

Figure 4:
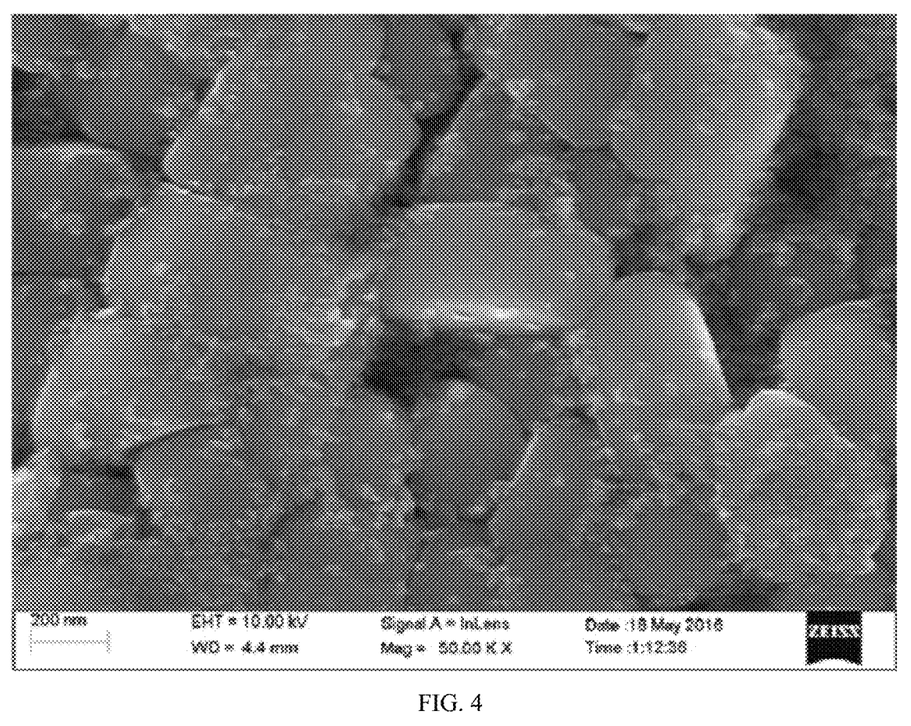
FIG. 4 is a SEM image of the modified positive electrode active material of Example 1.
Figure 5:
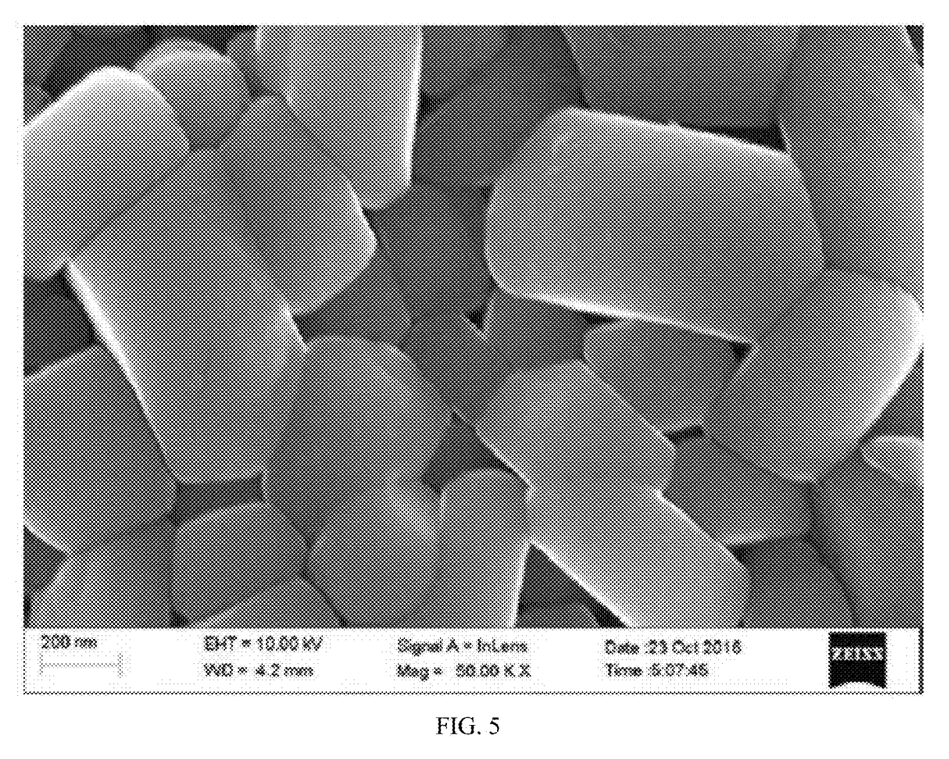
FIG. 5 is a SEM image of the modified positive electrode active material of Comparative Example 3.

In Comparative Examples 2-3, the high temperature storage performances of the lithium ion batteries obtained by using just either the aluminum oxide or the boron oxide as coating layer were deteriorated. Because when the aluminum oxide is just used as coating layer, the aluminum oxide is usually coated on the surface of the positive electrode active material substrate in an island-like or continuous island shape. It is difficult to form a uniform and continuous coating layer. The coating effect is not satisfactory, and the contact between the electrolyte and the positive electrode active material substrate cannot be effectively prevented. Therefore, the high temperature storage performance and the cycling performance of the lithium ion battery are not improved. When the boron oxide is just used as coating layer, the resulting coating layer is not stable at high temperature. Therefore, the improvement of the high temperature storage performance and the cycling performance of the lithium ion battery are adversely affected. See FIGS. 4 and 5, which show SEM images of the modified positive electrode active materials of Example 1 and Comparative Example 3, respectively. In FIG. 4, the particles having the island-like structure are aluminum oxide, and a thin layer of boron oxide is also coated on the surface of the aluminum oxide. In FIG. 5, just boron oxide is coated on the surface of the positive electrode active material substrate. It can be seen from Example 1 and Comparative Examples 4-6 that in case the first oxide layer substance and the second oxide layer substance in coatings are sequentially interchanged and/or in case the first oxide layer substance and the second oxide layer substance are directly mixed and sintered to obtain a mixed coating layer, the coating effects are deteriorated, thereby adversely affecting the improvement of high temperature storage performance and cycling performance of lithium ion battery.

The invention claimed is:

1. A modified positive electrode active material, comprising:
   a positive electrode active material substrate, wherein, the positive electrode active material substrate is lithium-nickel-manganese-cobalt-based oxide ternary material $LiNi_{0.8}Co_{0.1}Mn_{0.1}O_2$;
   a first oxide layer, coated on the surface of the positive electrode active material substrate and selected from one or more of oxides of element M, wherein the element M is Al, and the one or more of oxides is $Al_2O_3$; and
   a second oxide layer having a continuous layered structure, coated on the surface of the first oxide layer and selected from one or more of oxides of element M', wherein the element M' is B, and one or more of oxides is $B_2O_3$;
   wherein based on the mass of the positive electrode active material substrate, the element M is present in an amount of 0.01% to 2% in the first oxide layer and the element M' is present in an amount of 0.01% to 1% in the second oxide layer; and
   wherein the positive electrode active material substrate comprises primary particles and secondary particles formed by agglomeration of primary particles; and wherein the primary particles have a particle diameter of 0.2 μm to 1 μm and the secondary particles have a particle diameter of 5 μm to 18 μm.

2. The modified positive electrode active material according to claim 1, wherein the first oxide layer coated on the surface of the positive electrode active material substrate has an island-like shape.

3. The modified positive electrode active material according to claim 1, wherein based on the mass of the positive electrode active material substrate, the element M and the element M' are present in the following amounts:
   (i) the element M is present in an amount of 0.3%, and the element M' is present in an amount of 0.2%;
   (ii) the element M is present in an amount of 0.01%, and the element M' is present in an amount of 0.1%;
   (iii) the element M is present in an amount of 2%, and the element M' is present in an amount of 0.01%; or
   (iv) the element M is present in an amount of 2%, and the element M' is present in an amount of 1%.

4. A method for preparing the modified positive electrode active material according to claim 1, comprising the steps of:
   (i) mixing homogeneously a positive electrode active material substrate with first oxide layer substance itself or the precursor thereof, followed by sintering, to coat the surface of the positive electrode active material substrate with the first oxide layer selected from one or more of the oxides of element M, wherein the element M is Al, and the one or more of oxides is $Al_2O_3$;
   (ii) mixing homogeneously the substance obtained in step (i) with second oxide layer substance itself or the precursor thereof, followed by sintering, so that the formed second oxide layer is coated on the surface of the first oxide layer and has a continuous layered structure, wherein the second oxide layer is selected from one or more of the oxides of element M', wherein the element M' is B, and one or more of oxides is $B_2O_3$, thus yielding the modified positive electrode active material;
   wherein based on the mass of the positive electrode active material substrate, the element M is present in an amount of 0.01% to 2% in the first oxide layer and the element M' is present in an amount of 0.01% to 1% in the second oxide layer; and
   wherein the positive electrode active material substrate comprises primary particles and secondary particles formed by agglomeration of primary particles; and wherein the primary particles have a particle diameter of 0.2 μm to 1 μm and the secondary particles have a particle diameter of 5 μm to 18 μm;
   wherein the positive electrode active material substrate is lithium-nickel-manganese-cobalt-based oxide ternary material $LiNi_{0.8}Co_{0.1}Mn_{0.1}O_2$.

5. The method for preparing the modified positive electrode active material according to claim 4, wherein melting point of the first oxide layer substance is higher than melting point of the precursor of the second oxide layer substance, so that the second oxide layer after sintering is uniformly coated on the surface of the first oxide layer; and wherein the formed second oxide layer has a continuous layered structure.

6. The method for preparing the modified positive electrode active material according to claim 4, wherein melting point of the first oxide layer substance is higher than melting point of the second oxide layer substance itself, so that the second oxide layer after sintering is uniformly coated on the surface of the first oxide layer; and wherein the formed second oxide layer has a continuous layered structure.

7. The method for preparing the modified positive electrode active material according to claim 5, wherein
   the temperature of sintering in step (ii) is lower than that in step (i) and is equal to or greater than the melting point of the precursor of the second oxide layer substance;
   the temperature of sintering in step (i) is 600° C. to 750° C.;
   the temperature of sintering in step (ii) is 400° C. to 600° C.

8. The method for preparing the modified positive electrode active material according to claim 6, wherein
   the temperature of sintering in step (ii) is lower than that in step (i) and is equal to or greater than the melting point of the second oxide layer substance itself;
   the temperature of sintering in step (i) is 600° C. to 750° C.;
   the temperature of sintering in step (ii) is 400° C. to 600° C.

9. An electrochemical energy storage device, comprising the modified positive electrode active material, wherein the modified positive electrode active material comprises:
   a positive electrode active material substrate, wherein the positive electrode active material substrate is lithium-nickel-manganese-cobalt-based oxide ternary material $LiNi_{0.8}Co_{0.1}Mn_{0.1}O_2$;
   a first oxide layer, coated on the surface of the positive electrode active material substrate and selected from one or more of oxides of element M, wherein the element M is Al, and the one or more of oxides is $Al_2O_3$; and a second oxide layer having a continuous layered structure, coated on the surface of the first oxide layer and selected from one or more of oxides of element M', wherein the element M' is B, and one or more of oxides is $B_2O_3$;

wherein based on the mass of the positive electrode active material substrate, the element M is present in an amount of 0.01% to 2% in the first oxide layer and the element M' is present in an amount of 0.01% to 1% in the second oxide layer; and wherein the positive electrode active material substrate comprises primary particles and secondary particles formed by agglomeration of primary particles; and wherein the primary particles have a particle diameter of 0.2 μm to 1 μm and the secondary particles have a particle diameter of 5 μm to 18 μm.

* * * * *